Oct. 18, 1966     H. E. EMIGH     3,279,096

GROUND TRAINER PLATFORM

Filed Oct. 29, 1964     4 Sheets-Sheet 3

INVENTOR.
HAROLD E. EMIGH
BY
ATTORNEY

Oct. 18, 1966  H. E. EMIGH  3,279,096
GROUND TRAINER PLATFORM
Filed Oct. 29, 1964  4 Sheets-Sheet 4
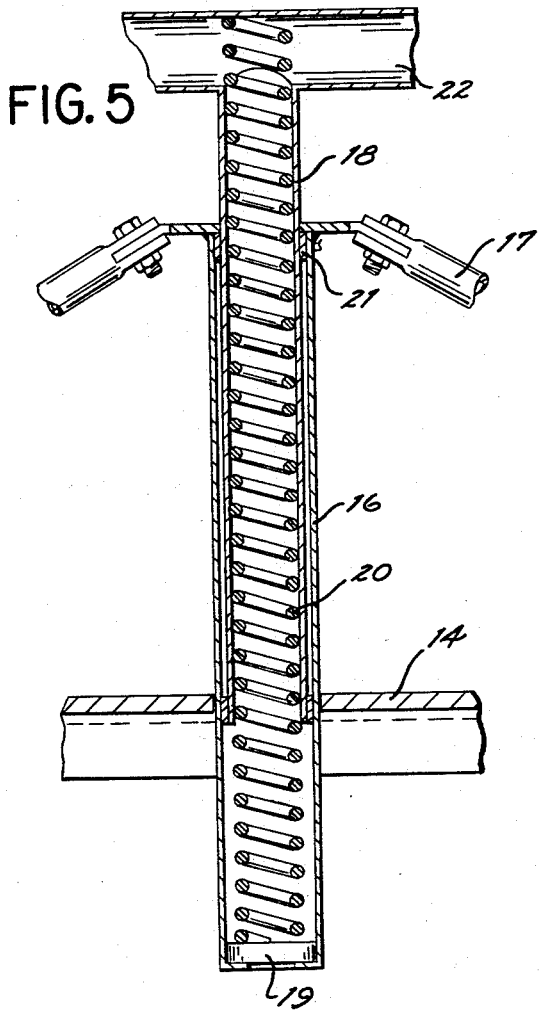
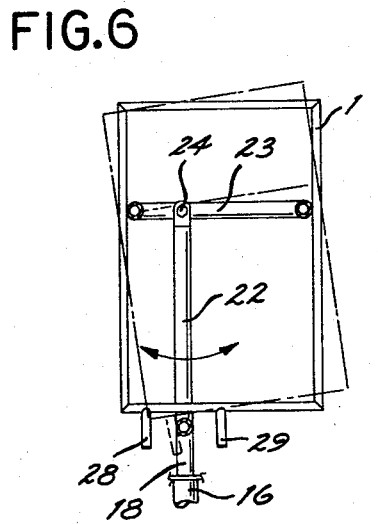
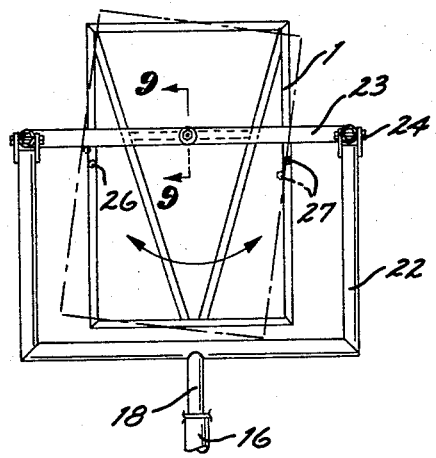
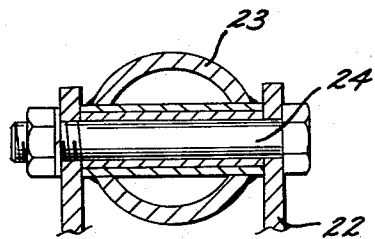
INVENTOR.
HAROLD E. EMIGH
BY
ATTORNEY

3,279,096
GROUND TRAINER PLATFORM
Harold E. Emigh, 2901 E. Spring St., Long Beach, Calif.
Filed Oct. 29, 1964, Ser. No. 407,325
7 Claims. (Cl. 35—12)

This invention relates to a ground trainer platform, particularly for the training of helicopter students.

An object of my invention is to provide a novel ground trainer platform in which the student can receive helicopter flight training without moving vertically more than approximately eighteen inches off of the ground, more or less.

Another object of my invention is to provide a novel ground trainer platform in which the student can perform turning, banking, and pitching maneuvers in the helicopter fuselage without moving more than about eighteen inches or so above the ground; and also the student can execute close to ground patterns by permitting the platform to roll horizontally on casters or wheels, and all of these maneuvers can be performed without any danger to the student or to the apparatus.

Another object of my invention is to provide a novel ground trainer platform in which a heavy coil spring engages the supporting shaft, and the force required to compress this spring is approximately half of the weight of the helicopter fuselage, engine and propellers.

Other objects, advantages and features of invention may appear from the accompanying drawings, the subjoined detailed description and the appended claims.

In the drawings

FIGURE 5 is a fragmentary longitudinal sectional view of the fuselage supporting shaft and the telescopic tube into which it extends.

FIGURE 6 is a side elevation of the gimbal and fuselage mounted thereon taken on line 6—6 of FIGURE 3.

FIGURE 7 is a vertical sectional view taken on line 7—7 of FIGURE 4.

FIGURE 8 is a traverse sectional view of one gimbal pivot taken on line 8—8 of FIGURE 4.

FIGURE 9 is a vertical sectional view of one gimbal pivot taken on line 9—9 of FIGURE 7.

Figure 1:
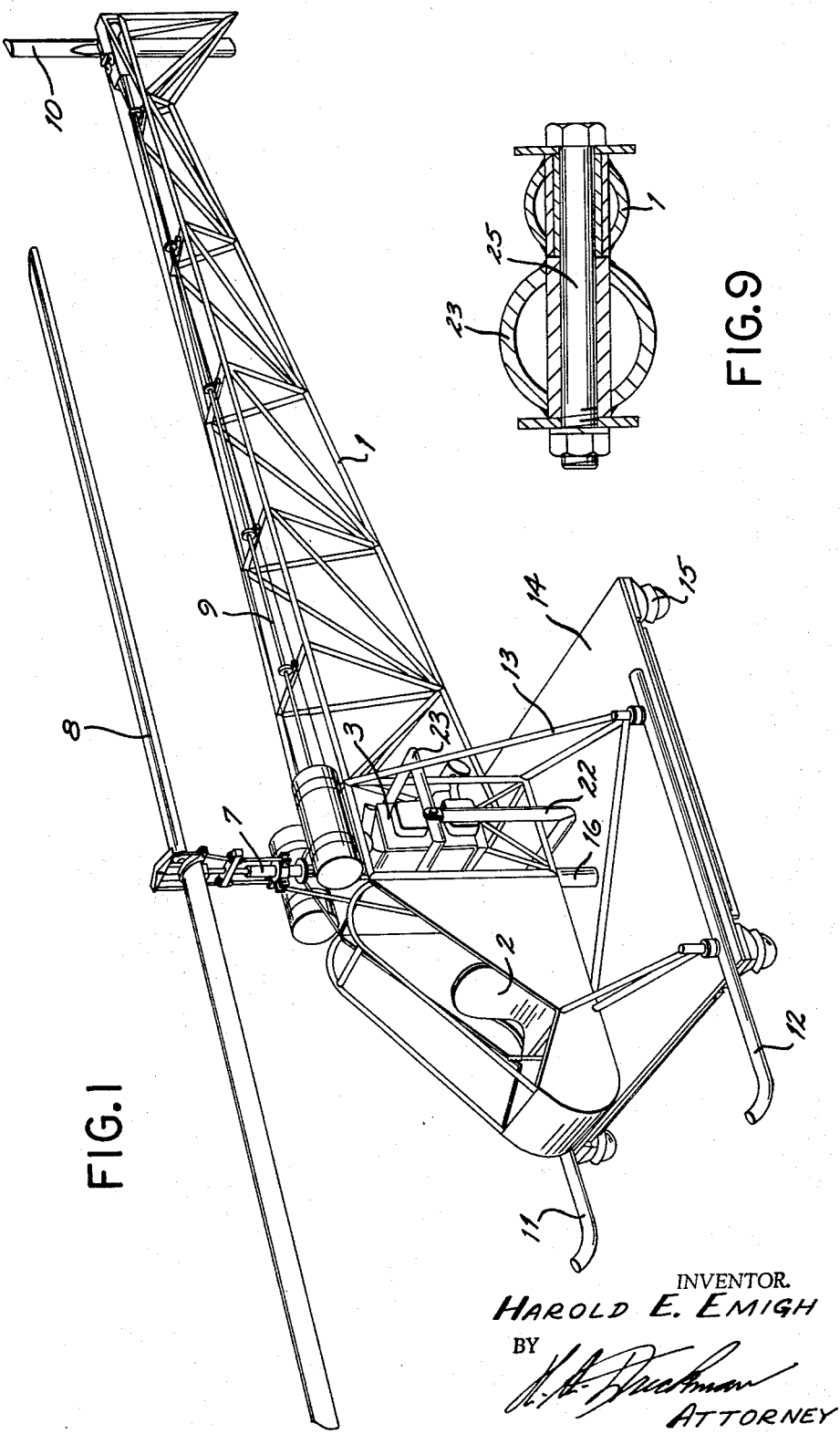
FIGURE 1 is a perspective view of my ground trainer platform.
Figure 2:
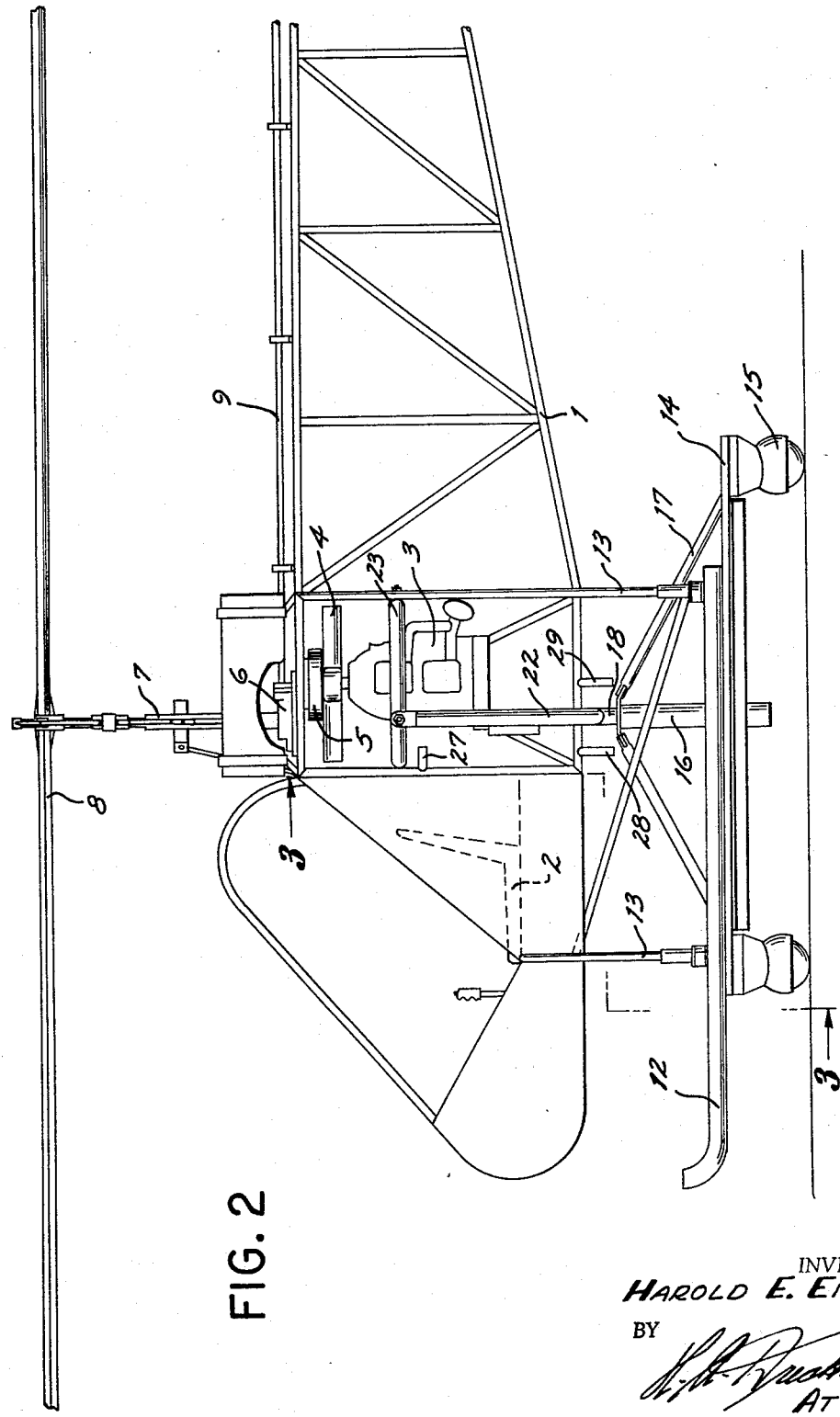
FIGURE 2 is a fragmentary side elevation of the same.
Figure 3:
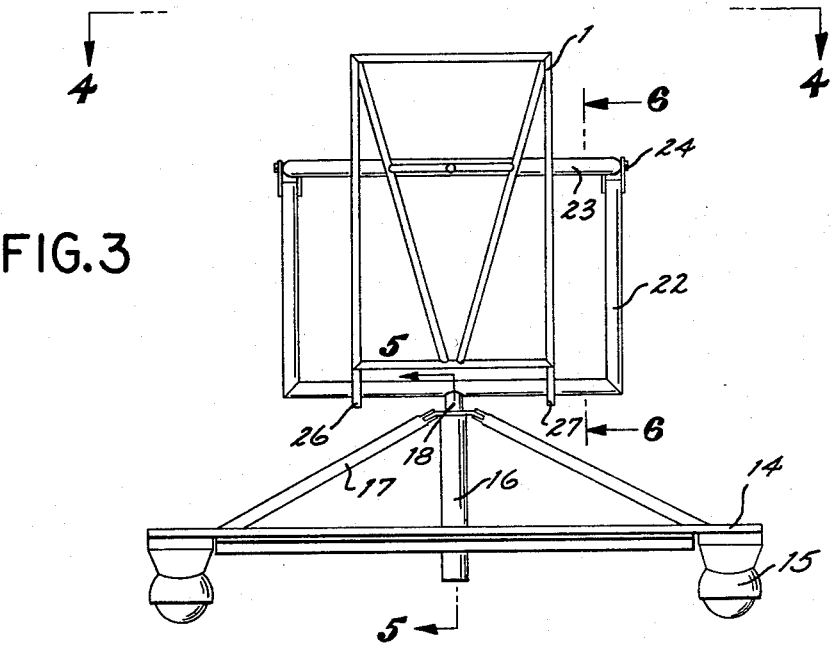
FIGURE 3 is a sectional view taken on line 3—3 of FIGURE 2.
Figure 4:
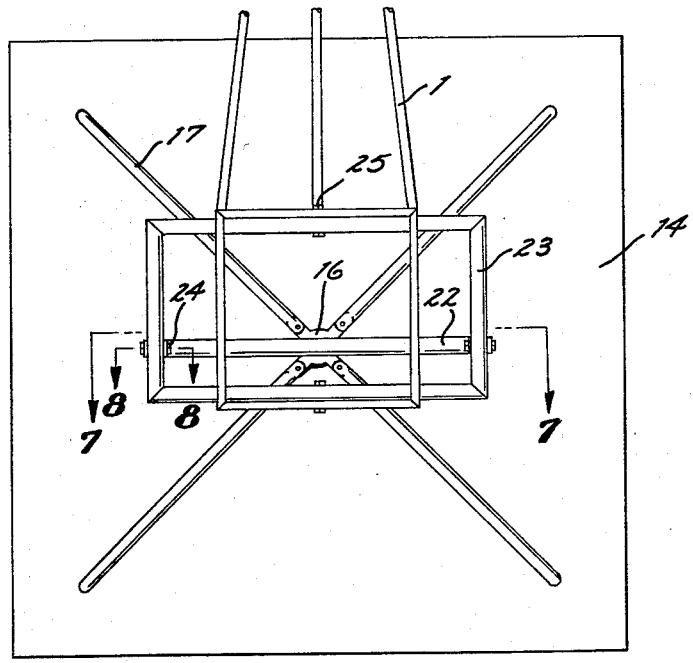
FIGURE 4 is a fragmentary top plan view of the fuselage and the supporting platform.

Referring more particularly to the drawing, the numeral 1 indicates the main frame or fuselage of a helicopter, and this fuselage may be usual and well known as far as design is concerned. A single seat 2, in which the student sits, is positioned at the forward end of the fuselage 1 and the usual engine and control surface mechanisms are mounted adjacent to the seat 2, and these mechanisms are usual and well known for a helicopter. An engine 3 is mounted in the fuselage 1 and this engine drives through a freewheeling assembly 4, and thence through a centrifugal clutch 5, and finally to a semicoaxial gear box 6, whereby the rotor shaft 7 is driven. The gear box 6, into which the shaft 7 extends, will thus rotate the flapping rotor head 8 which embodies the novel control system. Again all of this is usual and well known in the helicopter art. A tail rotor shaft 9 is also driven through the medium of the gear box 6, and the shaft 9 rotates the tail or stabilizing rotor 10. A pair of skids 11–12 are mounted below the fuselage 1 and are connected to the fuselage by a plurality of brace rods 13 which extend between the skids and the fuselage and serve to support the entire fuselage construction in one position of the parts, that is, when the helicopter is at rest.

A platform 14, preferably rectangular in shape, is supported on a plurality of wheels or rollers 15 which permit the platform to roll horizontally over the surface of the ground when these wheels or rollers are unlocked. The wheels or rollers 15 have a well known type of locking mechanism associated therewith (not shown), which again is usual and well known in the caster art. Thus when the rollers or casters 15 are locked the platform 14 will be immobile, but when the casters are unlocked the platform 14 can roll horizontally over the ground to perform close to the ground helicopter maneuvers, as will be subsequently described. The total weight of the platform 14 is somewhat greater than the total lifting force of the helicopter rotor blade 8, so that when the rotor is being driven the platform 14 will at all times be resting on the ground and will not be lifted by the lifting force of the helicopter. The skids 11–12 will rest on top of the platform 14 when the helicopter is at rest and thus the platform will support the entire weight of the helicopter, fuselage, engine and associated parts.

A vertical sleeve 16 is fixedly mounted in a vertical position in the center of the platform 14, and the upper end of this sleeve is braced by a plurality of brace rods 17 which extend angularly from the top of the sleeve 16 adjacent to the periphery of the platform 14, thus rigidly supporting the sleeve 16 in position.

A fuselage supporting tubular shaft 18 telescopes into the sleeve 16 and extends through the upper end of this sleeve. At the lower end of the sleeve 16 a thrust bearing 19 is fixedly mounted, and is engaged by a heavy coil spring 20 within the tubular shaft 18. The upper end of the spring 20 bears against one wall of the attachment coupling frame, which frame is subsequently described. This spring, in compression, will support approximately one-half of the total weight of the helicopter, fuselage, engine, etc. This force, however, can be varied as required. The purpose of this is to reduce the amount of propeller thrust required to lift the helicopter and its passenger.

The fuselage 1 and its component parts are mounted on the shaft 18 with a gimbal assembly as follows: A U-shaped coupling frame 22 is formed or fixedly attached to the upper end of the shaft 18, and this U-shaped coupling is pivotally attached to the gimbal 23 which is rectangular in shape. The gimbal 23 is positioned on the combined center of gravity of the fuselage 1 and the frame 22 is pivotally attached thereto by suitable pivot pins, such as 24 shown in FIGURE 8. The gimbal 23 is also pivotally attached to the fuselage 1 by the pivots 25, as shown in FIGURE 9. The pivots 24 and 25 are arranged at right angles to each other so that the gimbal will have a proper tilting capacity both as to the roll maneuver of the fuselage 1 and the pitch maneuver. These roll and pitch positions of the fuselage 1 are shown in dotted lines in FIGURES 6 and 7. Since the gimbal 23 is positioned on the combined center of gravity of the fuselage 1, the various pitch and roll maneuvers can be readily performed by the student.

A pair of horizontally spaced roll limiting pins or lugs 26 and 27 project from the fuselage 1 adjacent to the gimbal 23, to be engaged by this gimbal and limit the rolling action of the fuselage. Similarly, a pair of pitch limiting stops or lugs 28–29 project from the fuselage 1 adjacent to the U-shaped connecting frame 22. These lugs or stops limit the pitch action of the fuselage 1 as show in FIGURE 6.

In operation

The fuselage 1 of the helicopter rests on top of the platform 14 by gravity and with the skids 11 and 12 resting on the platform. The skids 11 and 12 are not attached to the platform 14 but are free to move in a vertical plane when the rotor 8 is operating. The fuselage 1 is attached to the platform 14 in the following manner: The supporting shaft 18 extends into the sleeve 16 and is engaged by the heavy coil spring 20 to urge the shaft 18 into its uppermost position within the sleeve 16, that is, with the skids 11 and 12 of the fuselage 1 resting on the platform 14. The spring 20 in compression will sustain approximately one-half of the total weight of the helicopter while the spring is compressed. The student sits in the seat 2 and operates the engine and various control surfaces, thus causing the fuselage 1 to rise vertically above the platform 14 to a distance of about eighteen inches, more or less. At this vertical height above the platform 14 the fuselage 1 can perform the usual pitch, roll and turn operations, that is, these normal operations which occur at a considerable height in the standard helicopter. As soon as the power of the rotor 18 is reduced the fuselage 1 will immediately settle downwardly, until the skids 11–12 are again resting on the platform 14. To permit the student to perform ground movements of the helicopter fuselage 1, I provide rollers or casters 15 on the bottom of the platform 14, and when these casters are unlocked the fuselage 1 will move horizontally over the surface of the ground, and with the skids 11 and 12 resting on top of the platform as shown in FIG. 1. The gimbal 23 is positioned in the combined center of gravity of the fuselage 1, and since the supporting shaft 18 is pivotally attached to the gimbal 23 by the yoke 22, the usual pitch, roll and turn operations of the fuselage 1 can be effectively simulated even though the fuselage 1 is only a matter of inches above the platform 14. The weight of the platform 14 is such that the full power of the rotor 8 will not lift that platform off of the ground, that is, the platform 14 remains in contact with the ground at all times, even though the platform can roll horizontally as previously described.

Having described my invention, I claim:

1. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    means pivotally attaching the supporting shaft to the gimbal,
    and spring means on the platform engaging the supporting shaft.

2. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    means pivotally attaching the supporting shaft to the gimbal,
    spring means on the platform engaging the supporting shaft,
    and casters on the platform engaging the ground.

3. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    said gimbal being mounted in the combined centers of gravity of the fuselage,
    means pivotally attaching the supporting shaft to the gimbal,
    and spring means on the platform engaging the supporting shaft.

4. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    said gimbal being mounted in the combined centers of gravity of the fuselage,
    means pivotally attaching the supporting shaft to the gimbal,
    spring means on the platform engaging the supporting shaft,
    and casters on the platform engaging the ground.

5. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    means pivotally attaching the supporting shaft to the gimbal,
    a vertical sleeve on the platform, a spring in said sleeve, said supporting shaft telescoping into the sleeve and engaged by the spring.

6. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    said gimbal being mounted in the combined centers of gravity of the fuselage,
    means pivotally attaching the supporting shaft to the gimbal,
    a vertical sleeve on the platform, a spring in said sleeve, said supporting shaft telescoping into the sleeve and engaged by the spring.

7. A helicopter training apparatus comprising a helicopter with a seat, a propulsion unit in said fuselage, and a main rotor driven by the propulsion unit,
    a platform positioned below the fuselage, said fuselage resting on the platform in one position of the parts,
    a supporting shaft on the fuselage depending therefrom,
    a gimbal, means pivotally mounting the gimbal in the fuselage,
    said gimbal being mounted in the combined centers of gravity of the fuselage,
    means pivotally attaching the supporting shaft to the gimbal,
    a vertical sleeve on the platform, a spring in said sleeve, said supporting shaft telescoping into the sleeve and engaged by the spring,
    and casters on the platform engaging the ground.

References Cited by the Examiner

UNITED STATES PATENTS

| | | | |
|---|---|---|---|
| 2,896,947 | 7/1959 | Jacobs | 35—12 |
| 2,954,614 | 10/1960 | Vogt | 35—12 |
| 3,067,528 | 12/1962 | Agusta | 35—12 |
| 3,131,486 | 5/1964 | Derschmidt | 35—12 |
| 3,137,500 | 6/1964 | Stensager | 35—12 X |
| 3,164,911 | 1/1965 | Vaughen | 35—12 |
| 3,176,413 | 4/1965 | Dornier et al. | 35—12 |
| 3,225,458 | 12/1965 | Glockl | 35—12 |
| 3,228,119 | 1/1966 | Dornier | 35—12 |

EUGENE R. CAPOZIO, *Primary Examiner.*

S. M. BENDER, *Assistant Examiner.*